UNITED STATES PATENT OFFICE.

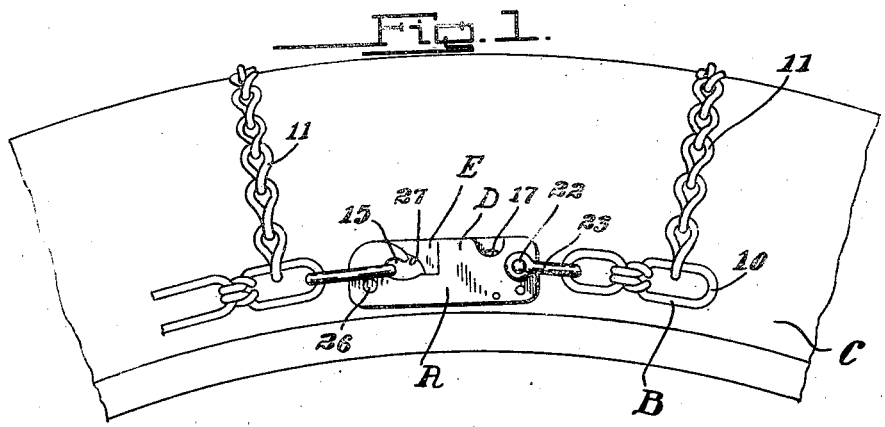

EUGENE E. GRIMES, OF TIFFIN, OHIO.

TIRE-CHAIN CONNECTOR.

1,412,936.

Specification of Letters Patent. Patented Apr. 18, 1922.

Application filed March 30, 1921. Serial No. 456,953.

*To all whom it may concern:*

Be it known that I, EUGENE E. GRIMES, a citizen of the United States, residing at Tiffin, in the county of Seneca and State of Ohio, have invented certain new and useful Improvements in Tire-Chain Connectors, of which the following is a specification.

This invention relates to connectors for chains and the primary object of the invention is to provide an improved means for connecting the terminals of a skid chain for vehicle tires together, so as to insure against the accidental displacement of the chain from off of the tire, said connector being so constructed as to permit the ready connection or disconnection of the chain terminals by hand.

Another object of the invention is to provide a novel means for operatively connecting the operating lever of the connector with the body portion thereof, so as to permit the lever to facilitate in bringing the terminals of the chain together, and a novel means for engaging said lever to prevent accidental actuation thereof.

A further object of the invention is to provide a chain connector embodying a body and a locking lever, the body forming a novel guard for the locking lever, so as to prevent foreign objects from coming in contact therewith and operating said lever.

A still further object of the invention is to provide an improved chain connector of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which:

Figure 1 is a side elevation of the improved chain connector showing the same connecting the opposite ends of a non-skid chain for automobile tires.

Figure 2 is a similar view showing the operating lever in its open position for permitting the connection or disconnection of the chain terminals.

Figure 3 is a longitudinal section through the improved chain connector showing the lever in its locked or operative position.

Figure 4 is a similar view showing the lever in its open or inoperative position.

Figure 5 is an edge view of the improved chain connector with the lever in its open or inoperative position.

Referring to the drawings in detail, wherein similar reference characters designate corresponding parts throughout the several views, the letter A indicates the improved chain connector; B a non-skid chain; and C, a tire with which it is associated.

It is to be understood that the tire chain B and the tire C form no part of the present invention, but have merely been shown for illustrating the use of the improved device.

The tire chain B as shown, is of the ordinary or any preferred construction, and includes the side chains 10 and the transverse connecting chains 11. The terminals of the side chains 10 are adapted to be connected together by means of the connector A as will be hereinafter more fully described.

The improved chain connector A includes the body portion D and the locking lever portion E.

The body D includes the side pieces or scales 12 and 13 and these pieces are connected together and held in spaced relation by means of the spring 14. The side plates or scales 12 and 13 are constructed identically the same, and one of the longitudinal edges adjacent to one of their ends is provided with inwardly extending recesses 15, which define the hook shaped members 16, which act as a means for retaining one of the chain terminals in position as will be hereinafter more fully described. Adjacent to the opposite ends of the side plates of the scales 12 and 13, the mentioned longitudinal edges are provided with inwardly extending notches 17, which form means for facilitating the operation of the lever E which also will be hereinafter more fully described.

The spring 14 includes a base 18, and the forwardly extending resilient portion 19. The base portion 18 is secured to the plates by means of suitable rivets or the like 20, while the opposite resilient portion is left free and is adapted to engage the lever E for holding the same in its inoperative or operative positions. The base 18 of the spring 14 and the side plates or scales 12 and 13 are provided with aligned openings 21 for the reception of the pivot pin 22, which is adapted to receive the shackle 23 for engaging one of the links of one of the chain terminals. The base 18 of the spring 14 has the inner edge thereof provided with an inclined seat 31 against which is adapted to rest the inner surface of the free end of the lever E. This prevents inward movement of the lever beyond a certain point.

The lever E includes a body 24, which is gradually tapered toward one end to facilitate the insertion of the lever through the end link of the free terminal of the tire chain B. The relatively broad end of the lever E is provided with a tang 25 which is arranged between the side plates or scales 12 and 13 and connected thereto by means of a pivot pin 26. The inner longitudinal edge of the body 24 of the lever E is provided with an inwardly extending offset notch 27, which is adapted to receive the end of the chain link of the free terminal of the tire chain, so as to facilitate the positioning of the link in the notches 15 and it can be seen that when the lever E is in its operative position, the notch 27 is in direct alignment with the notches 15 formed in the side plates or scale. The inner longitudinal edge of the body 24 of the lever E is also provided with an inwardly extending notch 28, which is adapted to extend in direct alignment with the notches 17 formed in inner longitudinal edges of the side plates 12 and 13 when the lever is in its operative position. These notches form a convenient means for permitting the operation of the lever to move the same to its inoperative position, and if so desired, a suitable tool, such as a screw driver or the like can be inserted in said notches for facilitating the swinging of said lever. It can be seen that the tang 25 is provided with a relatively long base 29 which is adapted to be engaged by the free end of the spring 14, when the lever is in its operative position. This absolutely precludes the accidental operation of the lever. When the lever is in its open position, the spring engages the opposite face of the tang and holds the same at an angle of substantially 135° which facilitates the positioning of the lever through the end link of the skid chain terminal.

In use of the improved connector, the shackle 23 is connected to the end link of one of the terminals of the chain, and the lever E is moved to the position shown in Figures 2 and 4 and is then inserted through the end link of the free chain terminal. The link is moved until the same rests in the notch 27, at which time the lever is moved to its closed position. Owing to the outer inclined face 30 of the hook 16, the link of the chain can be readily moved into the notch 15 below the bill of the hook 16 and when the lever is moved to its fully closed position, the walls of the notch 27 therein will overlie the lower wall of the notches 15, while the inner walls of the notches will be in direct alignment. The end link of the chain will engage the end walls of the notches 15 and 27, which will have a tendency to hold the lever in its normal position against accidental movement, and it can be seen that the tighter the pull on the same, the more the lever C will have a tendency to remain in its operative position. The resilient portion 19 of the spring 14 also holds the lever in its operative position against accidental displacement, and it can be seen that when a slack occurs in the skid chain through any cause at the connector A, the lever E will be prevented from swinging on its pivot 26 owing to this spring.

From the foregoing description, it can be seen that an improved chain connector has been provided, of novel construction, which will effectively prevent the accidental displacement of the terminals of the skid chain, and which will permit the easy connection and disconnection of the terminals of the bar A.

Changes in details may be made without departing from the spirit or scope of this invention; but,

I claim:

1. A skid chain connector comprising a pair or spaced side plates having chain link receiving notches formed therein, a lever pivotally secured between said plates having a chain link receiving notch formed therein, the lever being adapted to move the chain link into the notches formed in the side plates, and means connecting the side plates together and arranged to normally hold the lever in its operative and inoperative position.

2. A skid chain connector comprising a pair of spaced side plates having chain link receiving notches formed therein, a lever pivotally secured to and between said side plates, the lever having a chain link receiving notch formed therein arranged to be moved into alignment with the notches formed in the side plates, and a leaf spring carried by the side plates and arranged to engage the lever to hold the same against accidental operation.

3. A connector for skid chains comprising a pair of side plates having one of their longitudinal edges provided with inwardly extending offset chain link receiving notches, a lever pivotally secured to and between said side plates having an inwardly extending link receiving notch formed in its inner longitudinal edge, the lever being tapered toward its free end to facilitate the insertion thereof in a chain link, and resilient means engaging the levers for holding the lever against accidental movement when in its operative and inoperative position.

4. A connector for the terminals of tire skid chains comprising a pair of side plates, a leaf spring including a base, means securing the base to and between said plates for holding the plates in spaced relation, a lever pivotally secured to and between the plates, and at one end thereof in spaced relation to the base portion of the spring, the free end of the spring being adapted to engage the lever, the lever and plates having aligned tire chain link receiving notches formed therein.

5. A connector for the terminals of skid chains comprising side plates having tire chain receiving notches formed therein, a lever pivotally secured at one end to one end of said side plates, the lever having an inwardly extending offset notch formed in its inner edge arranged to be in alignment with the notches formed in said side plates when the lever is in its operative position, the inner longitudinal edges of said side plates being curved arcuately forwardly of said notches forming a guide surface leading to said notches, the inner edges of the side plates and lever having tool receiving notches formed therein.

6. A connector of the character specified comprising spaced plates provided at one end with corresponding notches, a spring secured between corresponding edge portions of the plate and serving to maintain the same in spaced relation, and a lock pivoted between the plates and closing the outer ends of the said notches formed therein and normally held in closed position by the action of the said spring.

7. A connector of the character specified comprising companion spaced plates having corresponding notches in one end thereof, a flat spring secured between the corresponding edge portions of the plates and a lock arranged between the opposite edge portions of the plates and pivoted at one end thereto and closing the outer ends of said notches formed therein, said plates being held in closed position by the spring.

EUGENE E. GRIMES.